United States Patent
Sheth et al.

(10) Patent No.: US 9,131,317 B2
(45) Date of Patent: Sep. 8, 2015

(54) SHARING PUBLIC ADDRESSING SYSTEM USING PERSONAL COMMUNICATION DEVICES IN AN AD-HOC NETWORK

(75) Inventors: Soham V. Sheth, San Diego, CA (US); Huey Trando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 13/275,100

(22) Filed: Oct. 17, 2011

(65) Prior Publication Data

US 2012/0269362 A1 Oct. 25, 2012

Related U.S. Application Data

(62) Division of application No. 12/333,127, filed on Dec. 11, 2008.

(51) Int. Cl.
| | |
|---|---|
| *H04R 25/00* | (2006.01) |
| *H04R 27/00* | (2006.01) |
| *H04R 5/04* | (2006.01) |
| *H04R 29/00* | (2006.01) |
| *H04R 3/12* | (2006.01) |
| *H04M 9/08* | (2006.01) |

(52) U.S. Cl.
CPC ............... *H04R 27/00* (2013.01); *H04R 5/04* (2013.01); *H04M 9/08* (2013.01); *H04R 3/12* (2013.01); *H04R 29/007* (2013.01)

(58) Field of Classification Search
CPC ............ H04R 27/00; H04R 5/04; H04R 3/12; H04R 2420/07; H04R 27/02; H04R 1/02; H04R 29/007; H04H 20/83; H04M 9/08

USPC ........... 381/82, 80, 81, 91; 434/350; 455/517, 455/435, 422
See application file for complete search history.

(56) References Cited

U.S. PATENT DOCUMENTS

| | | | |
|---|---|---|---|
| 5,860,023 A | 1/1999 | Tognazzini | |
| 6,332,163 B1 | 12/2001 | Bowman-Amuah | |
| 6,741,856 B2 * | 5/2004 | McKenna et al. .......... | 455/422.1 |
| 7,477,659 B1 | 1/2009 | Nee et al. | |
| 7,890,129 B2 | 2/2011 | Rosen et al. | |
| 2002/0019228 A1 | 2/2002 | McKenna et al. | |

(Continued)

FOREIGN PATENT DOCUMENTS

| | | |
|---|---|---|
| DE | 10124337 | 11/2002 |
| JP | H08298653 A | 11/1996 |

(Continued)

OTHER PUBLICATIONS

International Preliminary Report on Patentability—PCT/US2009/067633, The International Bureau of WIPO—Geneva, Switzerland, Feb. 1, 2011.

(Continued)

*Primary Examiner* — Thinh T Nguyen
(74) *Attorney, Agent, or Firm* — Joseph Hanasz

(57) ABSTRACT

A method, system, and computer program product for using a personal communication device as a microphone in a seminar or conference setting. A client is electrically connected to a PA system and one of many hosts can access the PA system by associating with the client. The association can be transferred by the client or the host. Tokens can be generated for each transfer and a map can be created and stored.

51 Claims, 2 Drawing Sheets

(56) References Cited

U.S. PATENT DOCUMENTS

| | | | |
|---|---|---|---|
| 2002/0037716 A1* | 3/2002 | McKenna et al. | 455/422 |
| 2003/0169720 A1* | 9/2003 | Sebastian et al. | 370/342 |
| 2004/0033478 A1* | 2/2004 | Knowles et al. | 434/350 |
| 2004/0137929 A1 | 7/2004 | Jones et al. | |
| 2005/0144200 A1* | 6/2005 | Hesselink et al. | 707/204 |
| 2005/0201370 A1 | 9/2005 | Poyhonen et al. | |
| 2006/0103721 A1 | 5/2006 | Shih et al. | |
| 2007/0297581 A1 | 12/2007 | Kuo et al. | |
| 2010/0150373 A1 | 6/2010 | Sheth et al. | |

FOREIGN PATENT DOCUMENTS

| | | |
|---|---|---|
| JP | 2001298782 A | 10/2001 |
| JP | 2003061183 A | 2/2003 |
| JP | 2005536133 A | 11/2005 |
| JP | 2007124488 A | 5/2007 |
| JP | 2007266992 A | 10/2007 |
| JP | 2007318395 A | 12/2007 |
| JP | 2007324768 A | 12/2007 |
| JP | 2008072195 A | 3/2008 |
| WO | 2004017662 A2 | 2/2004 |
| WO | WO2007015154 | 2/2007 |

OTHER PUBLICATIONS

International Search Report and Written Opinion—PCT/US2009/067633, International Search Authority—European Patent Office—Sep. 17, 2010.

Radio Equipment and Systems (RES); Digital Enhanced Cordless Telecommunications (DECT); Common Interface (CI); Part 1: Overview; ETS 300 175-1 ETSI Standards, LIS, Sophia Antipolis Cedex, France, vol. DECT, No. Second Edition, Sep. 1, 1996.

Unknown: "DCN Architect's and engineer's specifications" Art of Congress Architect Specs, Philips, Eindhoven, NL, Mar. 16, 2003. page Complete, XP002334459 p. 6-p. 120 p. 38-p. 43.

* cited by examiner

SHARING PUBLIC ADDRESSING SYSTEM USING PERSONAL COMMUNICATION DEVICES IN AN AD-HOC NETWORK

This Application is a divisional application of U.S. patent application Ser. No. 12/333,127, filed on Dec. 11, 2008, "Sharing Public Addressing System Using Personal Communication Devices in an Ad-Hoc Network".

BACKGROUND

1. Field

The presently claimed invention relates generally to communication systems, and more specifically to a method, system, and computer program product for using a personal communication device, such as a mobile phone, as a public address microphone in a local area network.

2. Background

During a seminar or conference, one or more speakers give out speeches to the audience in a conference or lecture hall. Usually, a cordless/corded microphone is used during such speeches. The speakers would rotate the microphone to the next speaker. Also, if anyone in the audience has questions or comments, a microphone is rotated amongst the audience. At times, meeting coordinators end up running around to hand over microphones to the audience and/or speakers. In the alternative, several microphones are located in the audience area and they are manually activated for speakers based on the closest microphone to the chosen speaker. Thus, a system is necessary to simplify the process and to avoid the use of specific microphone devices and use devices that most users already have in their possession to replace and use in lieu of the specific microphone devices.

SUMMARY

Aspects disclosed herein address the above stated needs by a user using his/her Personal Communication Device (PCD) as a public addressing microphone. Presently, almost everyone uses personal devices for communication. The presently claimed invention solves the above problem using a personal communication device, such as a cellular phone as a microphone for public addressing during a public gathering such as seminar, conference, or the like. While this proposal focuses on using wireless devices for this solution, it is also possible to implement a similar solution using fixed or wired communication devices and a network.

In a first aspect of the claimed invention a client is electrically connected to a PA system and is associated with a host. In a second aspect, a first host is associated with the client, and a second host is granted permission to transfer the association to the second host. The permission can be granted by the client or the first host. In a third aspect, the client is configured to associate with a first host and a second host requests the association. The first host can grant the association by generating a permission whereby the association is handed over to the second host. The permission can be granted for a specific amount of time or terminated at the will of the first host. A token can be generated each time the association is transferred and a map can be generated and stored for the association transfer.

DETAILED DESCRIPTION

The word "exemplary" is used herein to mean "serving as an example, instance, or illustration." Any aspect described herein as "exemplary" is not necessarily to be construed as preferred or advantageous over other aspects.

Figure 1:
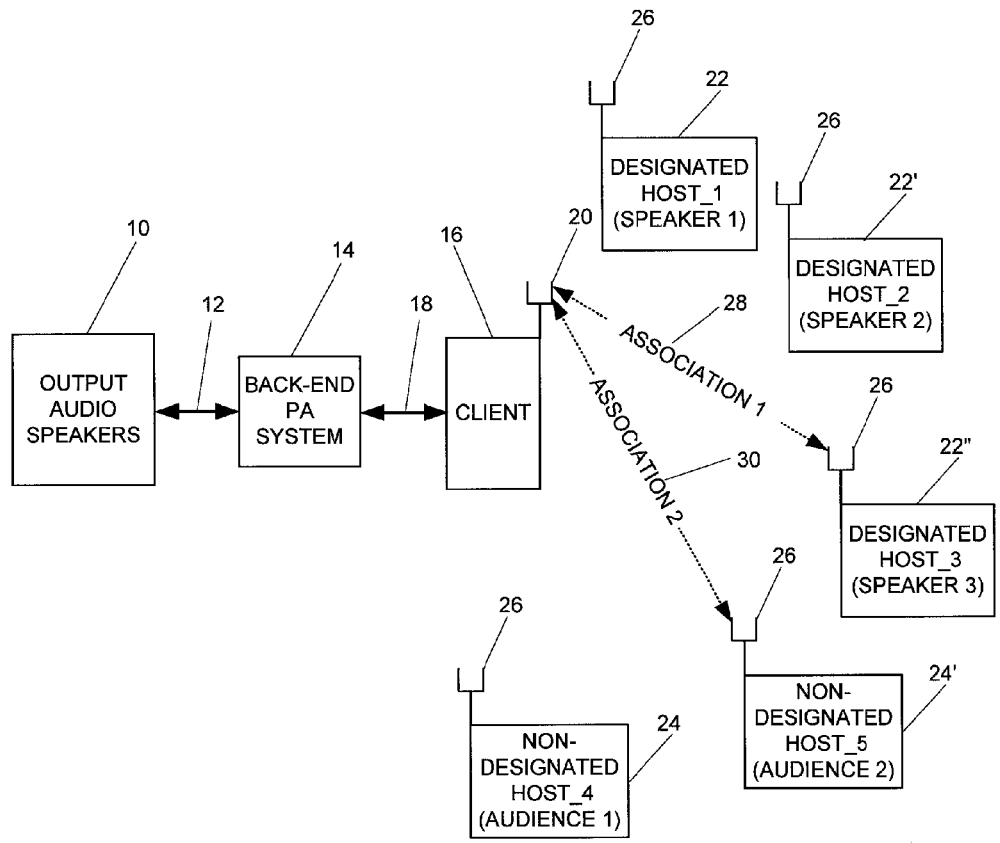
FIG. 1 is an exemplary system using the presently claimed invention.

This scheme allows any user to use his/her PCD as a public addressing microphone. FIG. 1 shows an exemplary system using the presently claimed invention. As in most public address (PA) systems, at least one output audio speaker 10 is connected 12 to a back end of PA system 14. This connection can be of any type of connection known in the art, including but not limited to electrical connections, optical connections and the like. Client 16 is the entity that provides audio feed 18 to back-end PA system 14. As shown, client 16 has an antenna or transceiver system 20 to receive and transmit data to hosts. The hosts in this exemplary aspect include Designated Host_1 22, Designated Host_2 22' and Designated Host_3 22", which are designated as the speakers, and Non-Designated Host_4 24 and Non-Designated Host_5 24', which are not designated as the speakers, hence the audience. Each of the hosts has a host antenna or transceiver system 26 for receiving and transmitting data to client 16, during Association 1 28 and Association 2 30. The operation of the system is described below.

Operation

Event coordinator may configure a client to designate the one or more users' PCDs as masters. The devices configured as master would have more control and privileges on the back-end PA system. Henceforth, devices configured as masters are called designated hosts, whereas, other devices are called non-designated hosts. Non-designated hosts access the PA system at the will of the designated hosts. In the speaker-audience usage scenario, speakers' devices act as designated hosts, whereas, audiences' devices act as non-designated hosts. While this disclosure suggests use of designated and non-designated hosts in speaker-audience scenario, it is also possible to have one or all non-designated hosts, one designated host or all designated hosts. In case of the all non-designated hosts, predetermined criteria can be used to select the host that can use the PA system. The client may participate in making such decisions.

Figure 2:
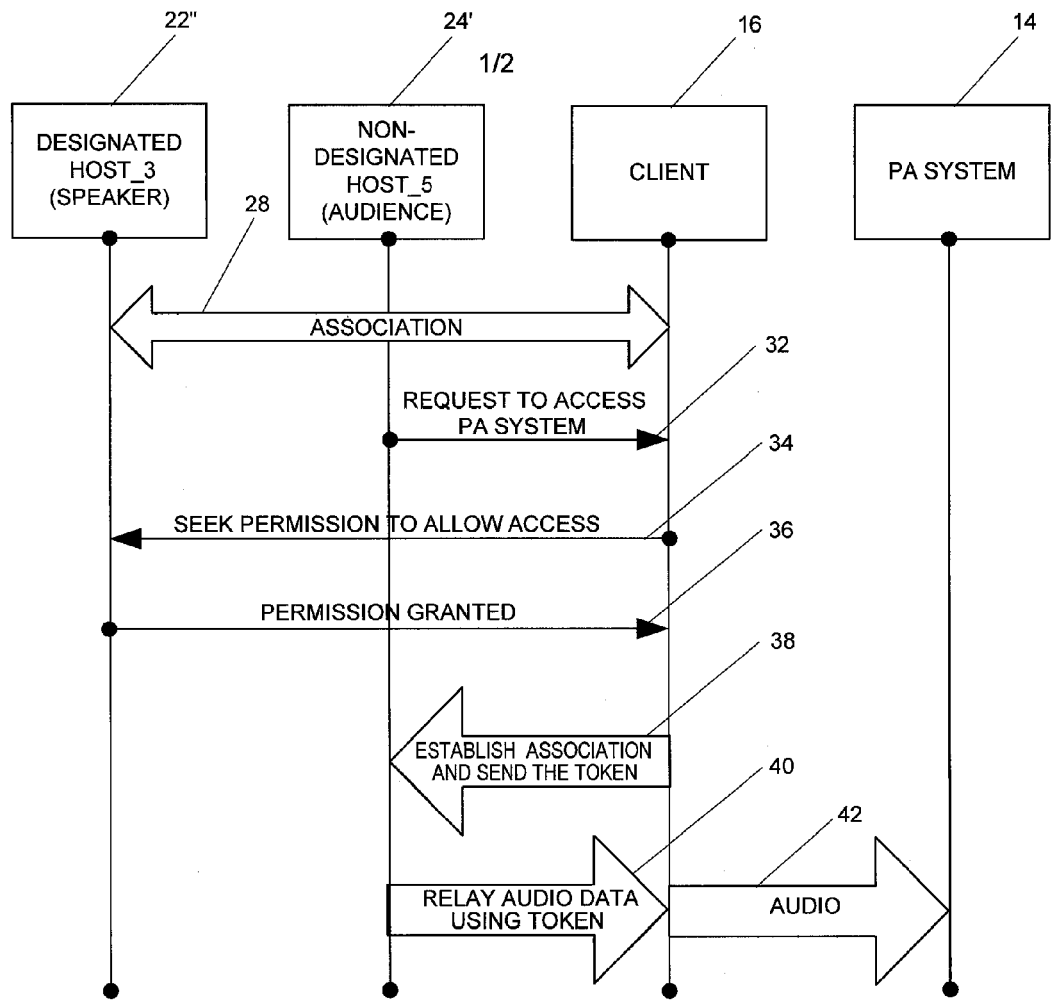
FIG. 2 is chart showing the operation of the system of FIG. 1.

The operation of the claimed system is shown in FIG. 2. In a first aspect, an event coordinator configures client 16 to designate Designated Host_3 22" as one of the speakers. Designated Host_3 22" establishes an Association 1 28 with client 16, when Designated Host_3 22" wants to access PA system 14. Client 16 is the entity that provides the audio feed to the back-end PA system 14 (e.g., amplifier, audio speakers). When the current speaker, Designated Host_3 22", is done speaking or using PA system 14, he may dissociate from client 16. The scenario for this first aspect ends here.

However, in a second aspect it is also possible that a next designated speaker, for instance Designated Host_2 22' of FIG. 1, may take over the association ownership (equivalent to rotating microphone) from the current speaker, Designated Host_3 22". The handover of the association ownership is described in co-pending U.S. Patent Application entitled "Apparatus and Methods for Establishing Client-Host Associations Within a Wireless Network", U.S. patent application Ser. No. 12/098,025, filed Apr. 4, 2008, and incorporated herein by reference. Once the association is transferred, client 16 maintains the information about the new speaker, Designated Host_2 22'. This describes a second aspect for the currently claimed invention.

Referring again to FIG. 2, in a third aspect, when a person from the audience Non-Designated Host_5 24' needs to ask a question or make a comment, he/she uses his/her PCD. Upon activation, the PCD makes a request for an Association 2 32 with client 16. Client 16 in-turn seeks the permission 34 from the speaker currently having the privilege to use the PA system, in this case Designated Host_3 22". Speaker, Designated Host_3 22", may grant permission to one of the many requesters in the audience, in this case Non-Designated Host_5 24', to access the PA system. This permission may be for a limited duration or open until it is ended either by the speaker, Designated Host_3 22", or audience, Non-Designated Host_5 24'. If the speaker, Designated Host_3 22", grants permission 36, client 16 generates a token 38 and sends it to the accepted host, in this case Non-Designated Host_5 24'. Client 16 also maintains the mapping for current token, the designated host and non-designated host, in this case Designated Host_3 22" and Non-Designated Host_5 24'. Upon receipt of the token and granted association permission 36, via establish requested association, and send token 38, Non-Designated Host_5 24' starts sending the audio data and the assigned token 40 to client 16. After verifying the token and sender's identity from the mapping, client 16 feeds the received audio data 42 to the PA system 14. Hence, the selected person's question/comment gets aired. When Non-Designated Host_5 24' is done using the PA system, it may terminate the association with client 16.

If the speaker, Designated Host_3 22", wants to repossess the ownership of PA system 14 at any point, it does so by notifying client 16. As a result, client 16 purges the token 38 and the host mapping while dissociating from the current non-designated host, Non-designated Host_5 24', and hence ends the access permission 36 provided to Non-Designated Host_5 24'.

Referring again to FIG. 1, the speaker, Designated Host_3 22", may grant access or permission to another audience member, for example Non-Designated Host_4 24 even if Non-Designated Host_5 24', is active. In such an event, client 16 generates a new token, overwrites the existing token, updates the host mapping with the Non-Designated Host_4 24 identity, releases the association with Non-Designated Host_5 24', the previous non-designated host, and notifies access permission and allocated token to Non-Designated Host_4 24, as previously described in FIG. 2. Non-Designated Host_4 24 uses the assigned token while sending the audio data to client 16. Upon successful verification as described above, client 16 feeds the data 42 to PA system 14.

If another speaker, for example Designated Host_2 22' takes over the association ownership, client 16 confirms the permission from the new designated host, Designated Host_2 22', in order to allow current non-designated host, Non-Designated Host_5 24', to continue using PA system 14. If the new designated host, Designated Host_2 22', grants the permission, client 16 updates the mapping table using the information from the new designated host, Designated Host_2 22'. However, if the new designated host, Designated Host_2 22' denies the permission, client 16 flushes the token, and the designated and non-designated host mapping while dissociating from the current non-designated host, Non-designated Host_5 24'. Hence, it stops airing audio data from any non-designated host until new permissions are granted by a new speaker, Designated Host_2 22'.

In yet another aspect of the claimed invention, client 16 can directly grant access to PA system 14 without seeking permission from the current host.

In another aspect, client 16, when associated with a designated host, may notify the requester (i.e. audience) that it (client 16) would callback when the response is received from the current designated host.

In yet another aspect, client 16 may store the requests from the multiple users from the audience (non-designated hosts) along with their profile. It may then forward each of the received requests to the speaker (i.e. designated host) sequentially or using a predetermined priority criteria. Client 16 may filter out one or more requests using a predetermined criteria and profile information of the requesting user from the audience.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein, and which may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the presently claimed invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the presently claimed invention. Various modifications to these aspects will be readily apparent to those skilled in the art, and the generic principles defined herein may be applied to other aspects without departing from the spirit or scope of the claimed invention. Thus, the presently claimed invention is not intended to be limited to the aspects shown herein, but is to be accorded the widest scope consistent with the principles and novel features disclosed herein.

The invention claimed is:

1. A non-transitory storage media comprising program instructions which are computer-executable to implement a use of a personal communication device as a microphone in a public addressing system, the public addressing system enabling a speaker to address multiple persons located in a single venue via a loudspeaker and at least one first host, the non-transitory storage media comprising:
    program instructions that provide a configuration of a client electrically connected to an audio system of the public addressing system;
    program instructions that cause an association of the client with the at least one first host;
    program instructions that request association between the client and at least one second host;
    program instructions that cause a generation of a permission to transfer the association from the at least one first host to the at least one second host;
    program instructions that cause the association to be handed over by the at least one first host to the at least one second host; and
    program instructions that cause audio and data to be sent by the at least one second host to the client, and audio to the audio system of the public addressing system for transmission over the loudspeaker;
    wherein the program instructions that cause the association to be handed over comprises program instructions that cause a first token to be sent to the at least one second host.

2. The non-transitory storage media of claim 1 wherein the at least one first host and the at least one second host are designated hosts.

3. The non-transitory storage media of claim 1 wherein the at least one first host comprises a designated host and the at least one second host comprises a non-designated host.

4. The non-transitory storage media of claim 1 further comprising program instructions that cause a disassociation of the at least one first host from the client.

5. The non-transitory storage media of claim 1 wherein the program instructions that cause a permission to be generated comprises program instructions that cause the at least one second host to request the permission from the at least one first host.

6. The non-transitory storage media of claim 1 wherein the program instructions that cause a permission to be generated comprises program instructions that cause the client to request the permission from the at least one first host.

7. The non-transitory storage media of claim 1 wherein the program instructions that cause the association to be handed occupy a predetermined time interval.

8. The non-transitory storage media of claim 1 wherein the program instructions that cause the association to be handed over comprises a termination instruction.

9. The non-transitory storage media of claim 1 wherein the client generates the first token and sends the first token to the at least one second host.

10. The non-transitory storage media of claim 9 further comprising program instructions that cause a map to be created of the sent first token, the at least one first host and the at least one second host.

11. The non-transitory storage media of claim 10 wherein the program instructions that cause a map to be created comprises program instructions that cause the map to be updated upon transfer of the association.

12. The non-transitory storage media of claim 1 further comprising program instructions that cause a termination of the association of the at least one second host and a handover of the association to at least one third host.

13. The non-transitory storage media of claim 12 further comprising program instructions that cause the client to generate a second token and to send the second token to the at least one third host and to update a map.

14. The non-transitory storage media of claim 1 further comprising program instructions that cause the at least one first host to retrieve the association at will.

15. The non-transitory storage media of claim 1 further comprising program instructions that cause a callback of the at least one second host upon receipt of a response from the at least one first host.

16. The non-transitory storage media of claim 1 further comprising program instructions that cause the requests for the association to be stored in a database.

17. The non-transitory storage media of claim 1 wherein the program instructions that cause the association to be requested further comprises program instructions that cause a profile to be sent of the at least one second host.

18. The non-transitory storage media of claim 1 further comprising program instructions that cause the at least one first host to call back the client to allow the access to the at least one second host.

19. A system for using a personal communication device as a microphone in a public addressing system, the public addressing system enabling a speaker to address multiple persons located in a single venue via a loudspeaker and at least one first host, the system comprising:
    a client electrically connected to an audio system of the public addressing system;
    means for causing an association of the client with the at least one first host;
    means for requesting association between the client and at least one second host;
    means for causing a generation of a permission to transfer the association from the at least one first host to the at least one second host;
    means for causing the association to be handed over by the at least one first host to the at least one second host; and
    means for causing audio and data to be sent by the at least one second host to the client, and audio to the audio system of the public addressing system for transmission over the loudspeaker;
    wherein the means for causing the association to be handed over comprises means for causing a first token to be sent to the at least one second host.

20. The system of claim 19 wherein the at least one first host and the at least one second host are designated hosts.

21. The system of claim 19 wherein the at least one first host comprises a designated host and the at least one second host comprises a non-designated host.

22. The system of claim 19 further comprising means for disassociating the at least one first host from the client.

23. The system of claim 19 wherein the means for causing the generation of the permission comprise means for causing the at least one second host to request the permission from the at least one first host.

24. The system of claim 19 wherein the means for causing the generation of the permission comprise means for causing the client to request the permission from the at least one first host.

25. The system of claim 19 wherein the means for causing the first host to hand over the association employs a termination instruction.

26. The system of claim 19 wherein the client is configured to generate the first token and send the first token to the at least one second host.

27. The system of claim 19 further comprising means for creating a map of the sent first token, the at least one first host and the at least one second host.

28. The system of claim 27 wherein the means for creating the map are configured to update the map upon transfer of the association.

29. The system of claim 19 further comprising means for terminating the association of the at least one second host and handing over the association to at least one third host.

30. The system of claim 19 wherein the client is further configured to generate a second token and to send the second token to the at least one third host and to update a map.

31. The system of claim 19 further comprising means for causing the at least one first host to retrieve the association at will.

32. The system of claim 19 further comprising means for causing a callback of the at least one second host upon receipt of a response from the at least one first host.

33. The system of claim 19 further comprising means for storing the requests for the association in a database.

34. The system of claim 19 further comprising means for causing the at least one first host to call back the client to allow the access to the at least one second host.

35. A method for using a personal communication device as a microphone in a public addressing system, the public addressing system enabling a speaker to address multiple persons located in a single venue via a loudspeaker and at least one first host, comprising:
providing a configuration of a client electrically connected to an audio system of the public addressing system;
causing an association of the client with the at least one first host;
requesting association between the client and at least one second host;
causing a generation of a permission to transfer the association from the at least one first host to the at least one second host;
causing the association to be handed over by the at least first host to the at least one second host; and
causing audio and data to be sent by the at least one second host to the client, and audio to the audio system of the public addressing system for transmission over the loudspeaker;
wherein causing the association to be handed over comprises causing a first token to be sent to the at least one second host.

36. The method of claim 35 wherein the at least one first host and the at least one second host are designated hosts.

37. The method of claim 35 wherein the at least one first host comprises a designated host and the at least one second host comprises a non-designated host.

38. The method of claim 35 further comprising causing a disassociation of the at least one first host from the client.

39. The method of claim 35 wherein causing the generation of the permission comprises causing the at least one second host to request the permission from the at least one first host.

40. The method of claim 35 wherein causing the generation of the permission the permission to transfer comprises causing the client to request the permission from the at least one first host.

41. The method of claim 35 further comprising creating a map of the sent first token, the at least one first host and the at least one second host.

42. The method of claim 41 wherein creating the map comprises updating the map upon transfer of the association.

43. The method of claim 35 further comprising terminating the association of the at least one second host and handing over the association to at least one third host.

44. The method of claim 35 further comprising generating a second token at the client, sending the second token to the at least one third host, and updating a map.

45. The method of claim 35 further comprising causing the at least one first host to retrieve the association at will.

46. The method of claim 35 further comprising causing a callback of the at least one second host upon receipt of a response from the at least one first host.

47. The method of claim 35 further comprising storing the requests for the association in a database.

48. The method of claim 35 further comprising sending a profile of the at least one second host.

49. The method of claim 35 further comprising causing the at least one first host to call back the client to allow access to the at least one second host.

50. The method of claim 35 wherein causing the handing over of the association occupies a predetermined time interval.

51. The method of claim 35 wherein causing the first token to be sent comprises generating the first token by the client and sending the first token by the client to the at least one second host.

* * * * *